US006989862B2

(12) United States Patent
Baharav et al.

(10) Patent No.: US 6,989,862 B2
(45) Date of Patent: Jan. 24, 2006

(54) SYSTEM AND METHOD FOR CONCURRENTLY DEMOSAICING AND RESIZING RAW DATA IMAGES

(75) Inventors: Izhak Baharav, Palo Alto, CA (US); Ramakrishna Kakarala, Sunnyvale, CA (US); Dietrich W. Vook, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 828 days.

(21) Appl. No.: 09/938,438

(22) Filed: Aug. 23, 2001

(65) Prior Publication Data

US 2004/0201721 A1 Oct. 14, 2004

(51) Int. Cl.
*H04N 5/335* (2006.01)

(52) U.S. Cl. .................................................. 348/273
(58) Field of Classification Search ................ 348/273, 348/272, 280, 242, 253, 342, 268, 237; 358/512; 382/167, 162, 298, 299
See application file for complete search history.

(56) References Cited

U.S. PATENT DOCUMENTS

| | | | | | |
|---|---|---|---|---|---|
| 5,990,950 | A | * | 11/1999 | Addison | 348/273 |
| 6,046,772 | A | * | 4/2000 | Howell | 348/273 |
| 6,229,578 | B1 | * | 5/2001 | Acharya et al. | 382/162 |
| 6,236,433 | B1 | | 5/2001 | Acharya et al. | 348/273 |
| 6,404,918 | B1 | * | 6/2002 | Hel-or et al. | 382/167 |
| 6,618,503 | B2 | * | 9/2003 | Hel-or et al. | 382/167 |
| 2002/0163583 | A1 | * | 11/2002 | Jones | 348/272 |
| 2002/0167602 | A1 | * | 11/2002 | Nguyen | 348/237 |
| 2002/0186309 | A1 | * | 12/2002 | Keshet et al. | 348/272 |
| 2003/0197796 | A1 | * | 10/2003 | Taubman | 348/272 |

FOREIGN PATENT DOCUMENTS

WO    WO 00/19728    4/2000

OTHER PUBLICATIONS

Woo–Jin Song and William A. Pearlman—"Edge Preserving Noise Filtering Based On Adaptive Windowing"; 8090 IEEE Transactions On Circuits & Systems, 35, Aug., 1988, No. 8, New York, N. Y., USA; pp. 1048–1055.
Constantin Vertan, Vasile Buzuloiu and Rangaraj M. Rangayyan—"A Family Of Order Statistic Based Dissimilarity Measures And Their Application In Image Processing"; Optimization Of Electrical And Electronic Equipments—Brasov 1998; pp. 711–714.
Y. Tim Tsai—"Color Image Compression For Single–Chip Cameras"; 8093 IEEE Transactions On Electron Devices, 36, May 1991, No. 5, New York, USA; pp. 1226–1232.
R. B. Paranjape, R. M. Rangayyan, W. M. Morrow and H. N. Nguyen—Dept. Of Electrical and Computer Engineering, The University of Calgary, Calgary, Alberta, Canada, T2N 1N4—"Adaptive–Neighborhood Image Processing"; SPIE vol. 1818, Visual Communications and Image Processing '92; pp. 198–207.
EP Search Report dated Feb. 17, 2005; 2 Pages.

* cited by examiner

*Primary Examiner*—Aung Moe (57) ABSTRACT

A system and method for processing mosaiced or raw data images operates to concurrently demosaic and resize the mosaiced images in a combined process. The combined demosaic/resize process allows the system to perform demosaicing and resizing more efficiently than conventional systems, which perform these processes separately and sequentially. Furthermore, the combined demosaic/resize process allows the system to produce demosaiced and resized images of higher quality as compared to demosaiced and resized images produced by the conventional systems.

25 Claims, 8 Drawing Sheets

SYSTEM AND METHOD FOR CONCURRENTLY DEMOSAICING AND RESIZING RAW DATA IMAGES

FIELD OF THE INVENTION

The invention relates generally to the field of image processing, and more particularly to a system and method for demosaicing and resizing raw data (mosaiced) images.

BACKGROUND OF THE INVENTION

Color digital cameras are becoming ubiquitous in the consumer marketplace, partly due to progressive price reductions. Color digital cameras typically employ a single optical sensor, either a Charge Coupled Device (CCD) sensor or a Complementary Metal Oxide Semiconductor (CMOS) sensor, to digitally capture a scene of interest. Both CCD and CMOS sensors are only sensitive to light intensity. Consequently, these sensors cannot discriminate between different colors. In order to achieve color discrimination, a color filtering technique is applied to separate light in terms of base colors, typically red, green and blue.

A common filtering technique utilizes a color-filter array (CFA), which is overlaid on a sensor array, to separate colors of impinging light in a Bayer pattern. The Bayer pattern is a periodic pattern with a period of two different color pixels in each dimension (vertical and horizontal). In the horizontal direction, a single period includes either a green pixel and a red pixel, or a blue pixel and a green pixel. In the vertical direction, a single period includes either a green pixel and a blue pixel, or a red pixel and a green pixel. Therefore, the number of green pixels is twice the number of red or blue pixels. The reason for the disparity in the number of green pixels is because the human eye is not equally sensitive to all three primary colors. Consequently, more green pixels are needed to create a color image of a scene that will be perceived as a "true color" image.

Due to the CFA, the image captured by the sensor is therefore a mosaiced image, also called "raw data" image, where each pixel only holds the value for either red, green or blue. The raw data image can then be demosaiced to create a color image by estimating the missing color values for each pixel of the image. These missing color values are estimated by using color information from surrounding pixels.

There are a number of conventional demosaicing methods to convert a raw data image into a color image. Three main common categories of demosaicing methods include interpolation-based methods, feature-based methods, and Bayesian methods. The interpolation-based demosaicing methods use simple interpolation formulas to interpolate the color planes separately. The interpolation-based demosaicing methods include bi-linear methods, band-limited interpolation methods using sinc() functions, spline interpolation methods, and the like. The feature-based demosaicing methods examine local features of a given image at the pixel level, and then interpolate the image accordingly. The basic idea of the feature-based methods is to avoid interpolating across edges of features. The Bayesian methods attempt to find the most probable color image, given the data, by assuming some prior knowledge of the image structure.

After the raw data images have been demosaiced, the images may be resized for a particular application. As an example, the demosaiced images may be reduced to ensure that the images are properly transmitted through a communications channel having a predefined bandwidth for video conferencing. As another example, the demosaiced images may be reduced to provide thumbnail images of the captured images for the user to preview. There are a number of conventional methods to resize an image into a smaller image. One common method involves creating a smaller version of the original image where each pixel in the smaller image receives the color values of the closest pixel in the original image. Another common method involves low-pass filtering or interpolating the original image and then decimating the image at the appropriate rate to produce a smaller image. The low-pass filtering or interpolation reduces aliasing in the decimating step.

Although the conventional methods for separately demosaicing raw data images and resizing the demosaiced images work well to produce demosaiced and resized images, there is a need for a system and method for more efficiently demosaicing and resizing raw data images to produce the demosaiced and resized images.

SUMMARY OF THE INVENTION

A system and method for processing mosaiced or raw data images operates to concurrently demosaic and resize the mosaiced images in a combined process. The combined demosaic/resize process allows the system to perform demosaicing and resizing more efficiently than conventional systems, which perform these processes separately and sequentially. Furthermore, the combined demosaic/resize process allows the system to produce demosaiced and resized images of higher quality as compared to demosaiced and resized images produced by the conventional systems.

A method in accordance with present invention includes receiving a mosaiced image to be concurrently demosaiced and resized. The mosaiced image is then partitioned into image blocks, which are sequentially processed. For each image block of the mosaiced image, predefined indicators are computed. In one realization, the computed indicators are statistical indicators, such as the variances of R, B, G1 and G2 color values within the current image block. In another realization, the computed indicators are feature-based indicator, such the gradients of R, B and G color values within the current image block. Next, the means of R, B and G color values within the current image block are computed.

If any of the computed indicators exceeds a predefined threshold, the current image block is divided in half to produce a new current image block, which is one of the halves of the current image block. The new current image block is then processed in the same manner as the last current image block. However, if none of the computed indicators exceeds the predefined threshold, the computed means of the current image block are embedded into a pixel of the final image, which is a demosaiced and resized image of the mosaiced image.

A system in accordance with the invention includes an image pipeline unit that receives a mosaiced image to be concurrently demosaiced and resized. The mosaiced image may be received from an image capturing unit of the system that electronically captures a scene of interest as a mosaiced image. The image pipeline unit includes an image partitioning module that partitions the mosaiced image into image blocks. The image pipeline unit also includes an indicator computer, processor and a color inserter. For each image block of the mosaiced image, predefined indicators are computed by the indicator computer. In one realization, the computed indicators are statistical indicators, such as the variances of R, B, G1 and G2 color values within the current image block. In another realization, the computed indicators are feature-based indicator, such the gradients of R, B and G color values within the current image block. In addition, for each image block of the mosaiced image, the means of R, B and G color values within the current image block are computed by the color inserter.

For a given image block, the processor determines whether any of the computed indicators exceeds a predefined threshold. If so, the current image block is divided in half to produce a new current image block, which is one of the halves of the current image block. The new current image block is then processed in the same manner as the last current image block. However, if none of the computed indicators exceeds the predefined threshold, the computed means of the current image block are embedded into a pixel of the final image.

An advantage of the invention is that the combined demosaic/resize process increases the efficiency to demosaic and to resize mosaiced images. In addition, the image quality of the resulting demosaiced and resized image can be significantly superior than demosaiced and resized images produced by conventional systems and methods.

Other aspects and advantages of the present invention will become apparent from the following detailed description, taken in conjunction with the accompanying drawings, illustrated by way of example of the principles of the invention.

DETAILED DESCRIPTION

Figure 1:
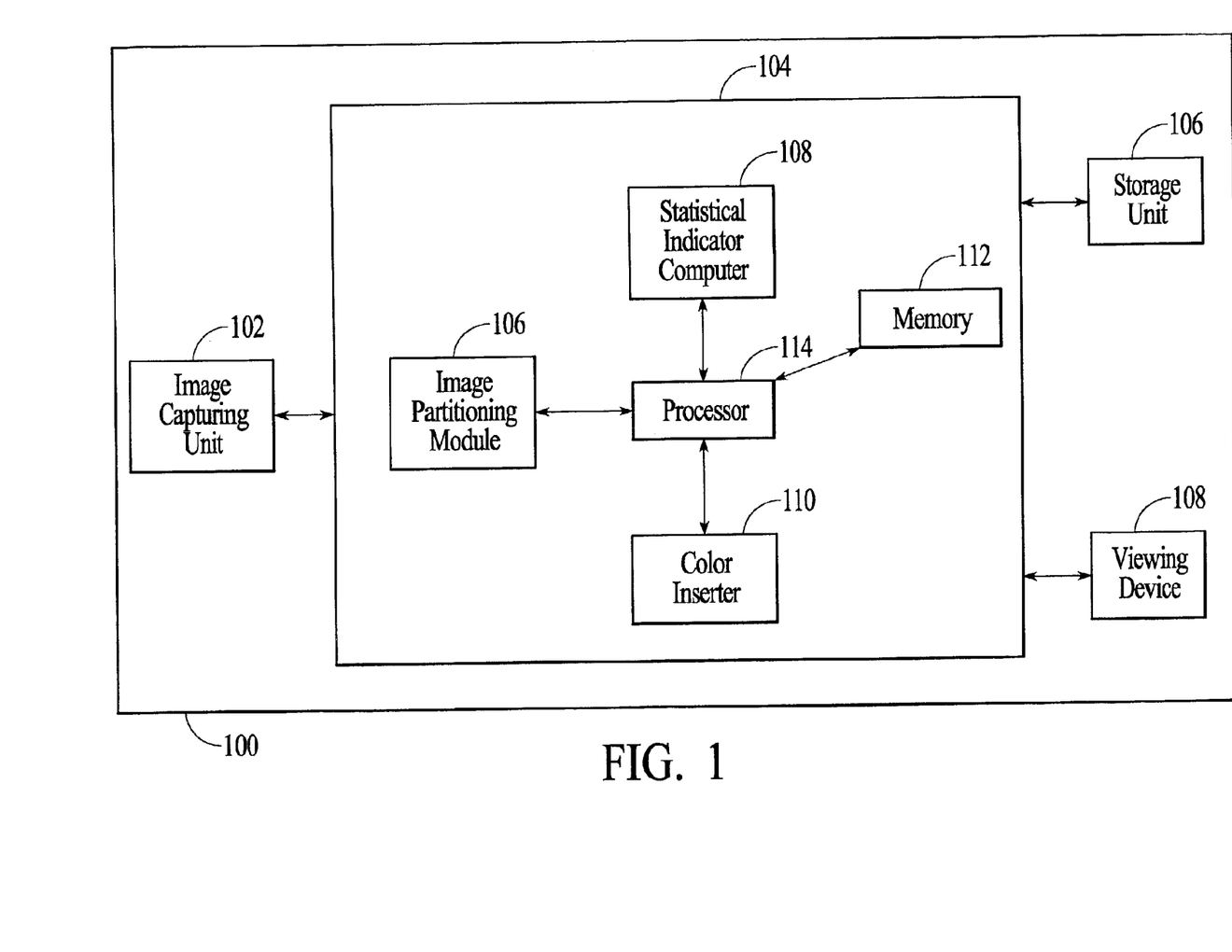
FIG. 1 is a block diagram of an image processing system in accordance with a first embodiment of the present invention.

With reference to FIG. 1, an image processing system 100 in accordance with a first embodiment of the invention is shown. The image processing system operates to electronically capture a scene of interest as a mosaiced or raw data images and then concurrently demosaic and resize the mosaiced image, which increases the efficiency of the system and improves the quality of the resulting demosaiced and resized image.

Figure 2A:
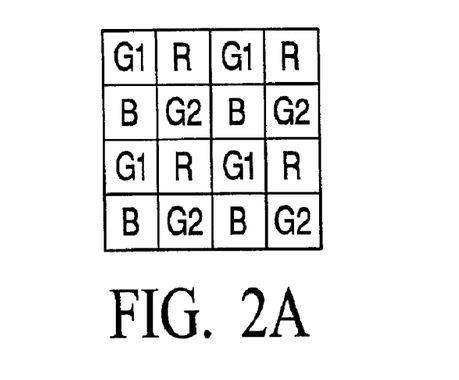
FIG. 2A illustrates the Bayer pattern of color values in a mosaiced image.

The image processing system 100 includes an image capturing unit 102, an image pipeline unit 104, a storage unit 106 and a viewing device 108. The image capturing unit 102 of the system operates to electronically capture a scene of interest in the form of a mosaiced or raw data image. The image capturing unit includes an electronic sensor and a color-filter array (CFA). The electronic sensor may be a Charge Coupled Device (CCD) sensor, a Complementary Metal Oxide Semiconductor (CMOS) sensor, or other type of photosensitive sensors. In an exemplary embodiment, the CFA includes red (R), green (G) and blue (B) filters arranged in a Bayer filter pattern. However, the CFA may include filters of other colors arranged in a different filter pattern. The CFA operates to allow only light of a particular color to be transmitted to each photosensitive element of the sensor. Thus, a digital image captured by the image capturing unit is a mosaiced image composed of single-colored pixels that are arranged in a color pattern in accordance with the filter pattern of the CFA. Consequently, each pixel of the mosaiced image has an intensity value for only a single color, e.g., R, G or B. A portion of a mosaiced image in a Bayer pattern is illustrated in FIG. 2A.

Figure 2B:
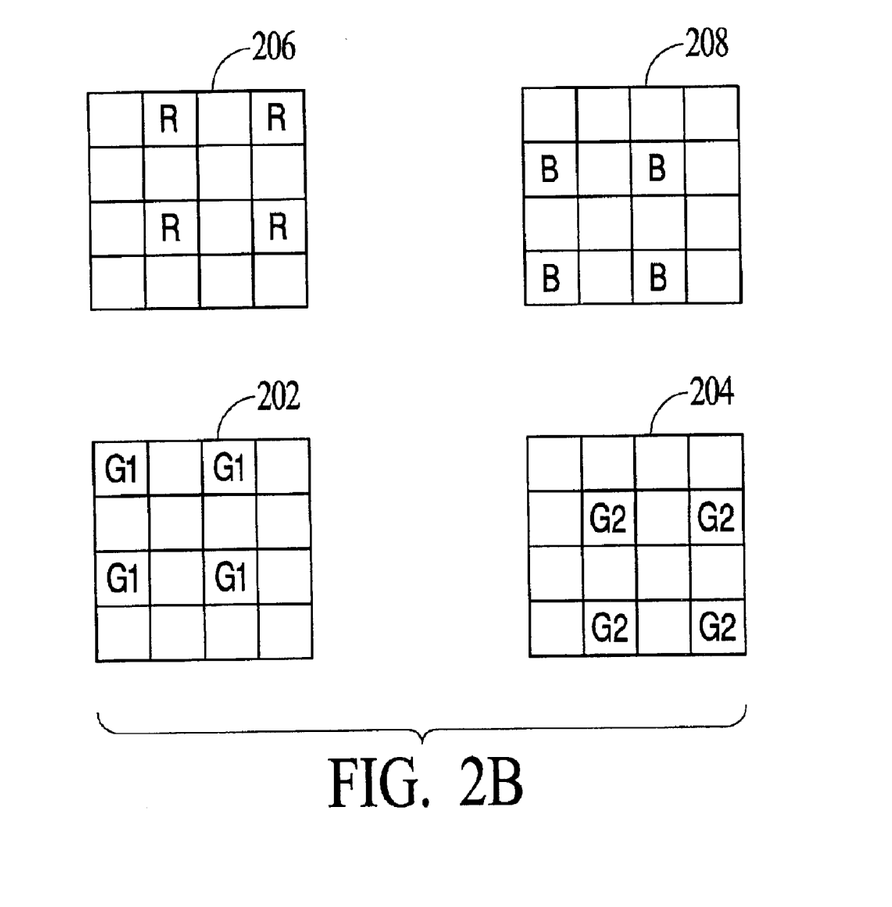
FIG. 2B illustrates the different color planes of a Bayer-patterned mosaiced image.

In the exemplary embodiment, since each pixel of a mosaiced image has an intensity value for only a single color, each pixel is missing intensity values for the other two colors that are needed to produce a demosaiced or color image. As illustrated in FIG. 2A, the G-colored pixels of a mosaiced image are identified as either G1 or G2, which represent two different types of G-colored pixels. Therefore, the mosaiced image of FIG. 2A can be decomposed with respect to four color components, R, G1, G2 and B, as illustrated in FIG. 2B. These decompositions of a mosaiced image will sometimes be referred herein as G1 plane 202, G2 plane 204, R plane 206 and B plane 208. The G1 and G2 planes are collectively referred herein as the G plane.

Turning back to FIG. 1, the image pipeline unit 104 of the image processing system 100 is connected to the image capturing unit 102 to receive the mosaiced images captured by the image capturing unit. The image pipeline unit operates to generate demosaiced and reduced images of the mosaiced images. The demosaiced and reduced images will sometimes be referred herein as the final images. The image pipeline unit includes an image partitioning module 106, a statistical indicator computer 108, a color inserter 110, memory 112 and a processor 114. The image partitioning module 106, the statistical indicator computer 108 and the color inserter 110 represent functional blocks and are not necessarily separate components. These components may be embodied in the image pipeline unit 104 in any combination of software, firmware and hardware.

The image partitioning module 106 of the image pipeline unit 104 operates to partition an input mosaiced image from the image capturing unit 102 into original image blocks. As an example, the image partitioning module may partition an input mosaiced image into 8×8 pixel image blocks. As described below, each original image block of the mosaiced image is converted into a single pixel to produce a final image of the input mosaiced image. Thus, the size of the final image, or the factor by which an input mosaiced image is reduced, depends on the size of the partitioned image blocks.

The color inserter 110 of the image pipeline unit 104 operates to compute the R, G and B color values for the converted pixel of a final image for a given original image block of an input mosaiced image. The R, G and B color values of the converted pixel are derived from the R, G1, G2 and B color values within a current image block of an input mosaiced image. The current image block may be the entire original image block of an input mosaiced image or a selected portion of the original image block. In the exemplary embodiment, the mean of R color values, the mean of G color values (both G1 and G2 color values), and the mean of B color values within a current image block are used as the R, G and B color values for the converted pixel of a final image. Thus, the color inserter is configured to compute the mean for each of the R, G and B color values of a current image block to provide R, G and B color values for the converted pixel of a final image.

The statistical indicator computer 108 of the image pipeline unit 104 operates to compute a statistical indicator for each of the R, G1, G2 and B color planes of a current image block to determine the statistical distribution of color values within the current image block. As an example, the statistical indicator may be the variance of intensity values for each color plane of a current image block, or other statistical indicators that can be used to measure changes of specific color intensity values within the current image block. The manner in which these statistical indicators are used by the image pipeline unit is described below.

The processor 114 of the image pipeline unit 104 operates to analyze the statistical indicators computed by the statistical indicator computer 108 to determine whether the color values within a current image block are suitable to compute the R, G and B color values for a converted pixel of the final image. Specifically, the processor determines whether any of the computed statistical indicators for a current image block is greater than a predefined threshold. If so, the current image block is reduced by one half to produce a new current image block. That is, the current image block is divided by half and then one of the two halves is selected as the new current image block. The new current image block is used to compute new statistical indicators by the statistical indicator computer 108. These new statistical indicators are then analyzed by the processor to determine whether the color values within the new current image block are suitable to compute the R, G and B color values for the converted pixel of the final image. However, if each computed statistical indicator for the current image block is not greater than the predefined threshold, the means of R, G and B color values of the current image block are embedded into the converted pixel of the final image. Embedding of color values into a pixel is defined herein as assigning the color values to the respective pixel. In the situation where the current image block includes only a single color value for the R, G1, G2 and B color planes (i.e., the current image block is a 2×2 pixel image block), the original R and B color values of the current image block are used for the converted pixel of the final image, and the average or one of the original G1 and G2 color values is used as the G color value for the converted pixel. The digital representation of the converted pixel is then temporarily stored in the memory 112 of the pipeline unit 104, which may be flash or random access memory, until all the original image blocks of the input mosaiced image have been converted to produce the final image, i.e., the demosaiced and reduced image.

The final image may be stored in the storage unit 106 and/or displayed on the viewing device 108 of the image processing system 100. The storage unit may be a conventional storage memory, such as DRAM. Alternatively, the storage unit may be a drive that interfaces with a removable storage medium, such as a standard computer floppy disk. The viewing device may be an LCD display or other comparable display that can display the final image.

Figure 3:
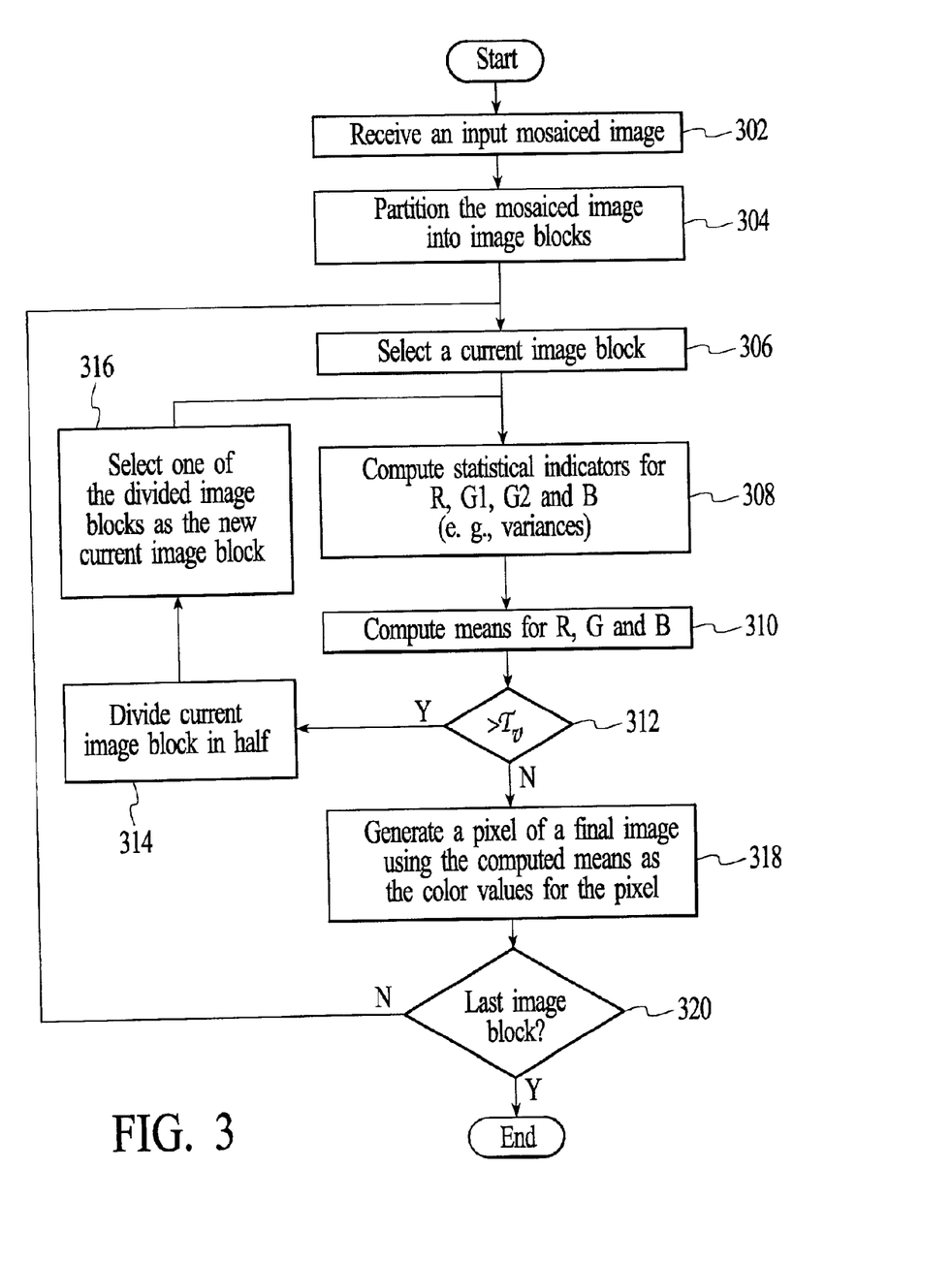
FIG. 3 is a process flow diagram of the demosaicing and resizing operation of the image processing system of FIG. 1.
Figure 4A:
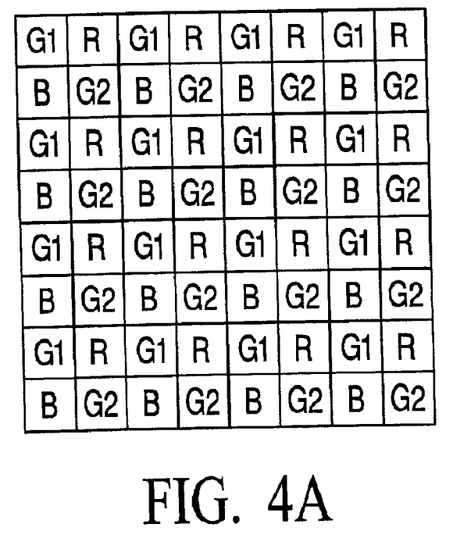
FIG. 4A illustrates a partitioned 8×8 image block of a mosaiced image.

The demosaicing and resizing operation of the image processing system 100 is described with reference to a flow diagram of FIG. 3 and the block diagram of FIG. 1. At step 302, an input mosaiced image of a scene of interest is received by the image pipeline unit 104. In the exemplary embodiment, the input mosaiced image is a Bayer patterned image captured by the image capturing unit 102. Next, at step 304, the mosaiced image is partitioned into image blocks. The size of the partitioned image blocks determines the factor by which the mosaiced image will be reduced. Thus, the size of the partitioned image blocks can be varied to select the size of the final image, which is the demosaiced and resized image of the input mosaiced image. However, in this description, the input mosaiced image is assumed to have been partitioned into 8×8 pixel image blocks. An exemplary 8×8 image block is illustrated in FIG. 4A.

Next, at step 306, one of the 8×8 image blocks is selected as a current image block to generate a pixel of the final image. At step 308, a statistical indicator for each of the R, G1, G2 and B color values within the current image block is computed by the statistical indicator computer 108 of the image pipeline unit 104. In the exemplary embodiment, the statistical indicators are variances of the R, G1, G2 and B color values, and thus, the statistical indicators are described herein as variances. Initially, the current image block is the selected 8×8 image block. However, as described below, the current image block may be a portion of the selected 8×8 image block. At step 310, the mean of R color values, the mean of G color values (both G1 and G2 color values), and the mean of B color values within the current image block are computed by the color inserter 110 of the image pipeline unit 104. Steps 308 and 310 may be executed in parallel. Next, at step 312, a determination is made whether any of the computed variances exceeds a threshold $T_v$, which may be empirically determined by experiments. If none of the computed variances exceeds the threshold, the process proceeds to step 318, where a pixel of the final image is generated by embedding the mean of R color values, the mean of G color values, and the mean of B color values for the current image block as the R, G and B color values into the pixel of the final image.

However, if any of the computed variances does exceed the threshold $T_v$, the process proceeds to step 314, where the current image block is divided in half. The current image block may be divided horizontally or vertically. The manner in which a current image block is divided is described in more detail below. Next, at step 316, one of the divided image blocks is selected as the new current image block. The particular selection of the divided image block is not critical to the invention. After the selection of the new current image block, the process then proceeds back to step 308, where the new current image block is processed in the same manner as described above with respect to the last current image block. Thus, the computed means of a current image block are not used when there is significant variation in any color values, which may indicate that the current image block includes an edge. Consequently, the color values within such image block are not interpolated and used as the color values for the pixel of the final image, since interpolation of colors across edges may introduce undesired colors into the pixel of the final image and may degrade the final image.

In an extreme situation, the current image block may be a 2×2 pixel image block, which is the smallest possible image block that still contains color information for each of the R, G1, G2 and B color planes. In this situation, the original R and B color values of the current image block are used for the pixel of the final image, and the average or one of the original G1, G2 color values is used as the G color value for the pixel of the final image.

After step 318, the process proceeds to step 320, where a determination is made whether the selected 8×8 image block of the input mosaiced image is the last image block to be processed. If so, the process comes to an end. However, if the selected image block is not the last 8×8 image block of the input mosaiced image, the process proceeds back to step 306, where the next 8×8 image block of the mosaiced image is selected to be processed.

Figure 4B:
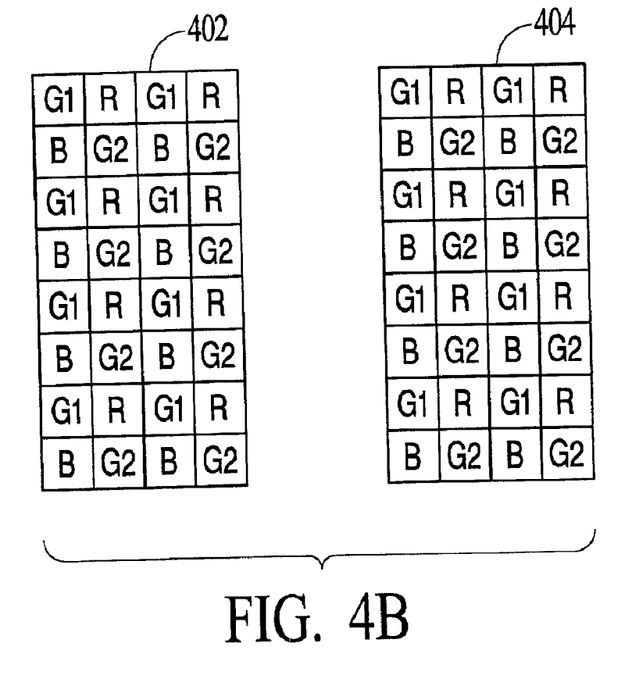
FIG. 4B illustrates an 8×8 image block of a mosaiced image that has been vertically divided in half.
Figure 4C:
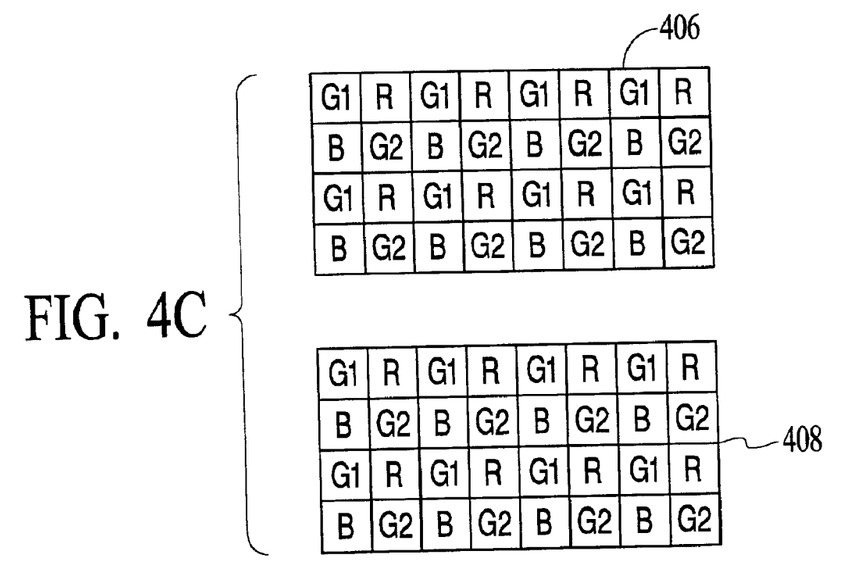
FIG. 4C illustrates an 8×8 image block of a mosaiced image that has been horizontally divided in half.
Figure 4D:
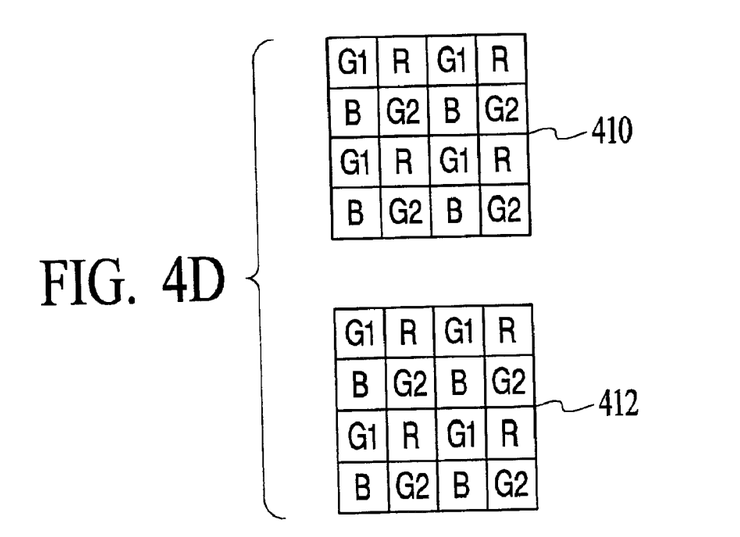
FIG. 4D illustrates a 4×8 image block of a mosaiced image that has been horizontally divided in half.
Figure 4E:
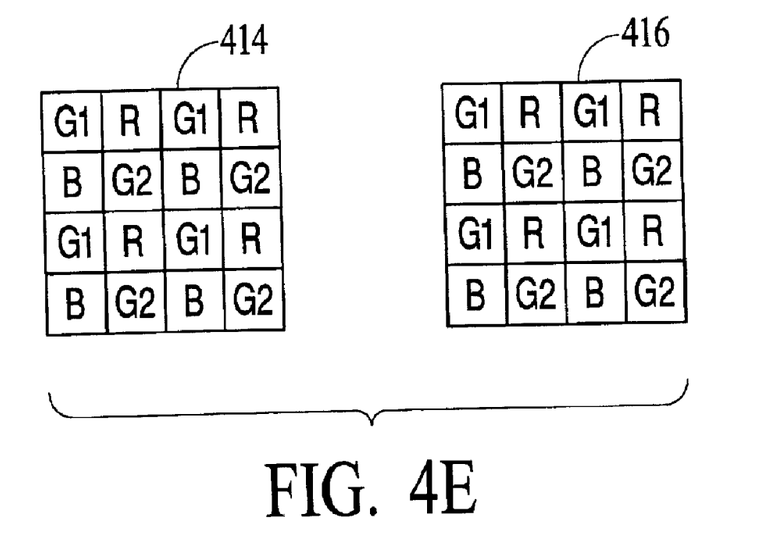
FIG. 4E illustrates an 8×4 image block of a mosaiced image that has been vertically divided in half.
Figure 4F:
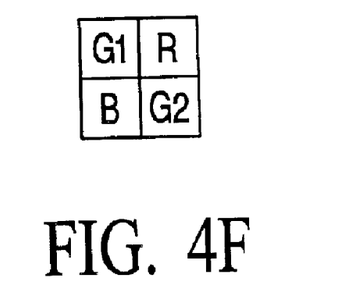
FIG. 4F illustrates a 2×2 image block of a mosaiced image.

The manner in which an original 8×8 image block, such as the 8×8 image block of FIG. 4A, is divided one or more times in accordance with the invention is now described. If any of the computed variances for the 8×8 image block exceeds the threshold, the 8×8 image block may be vertically divided in half into two 4×8 image blocks 402 and 404, as illustrated in FIG. 4B. Alternatively the 8×8 image block may be horizontally divided in half into two 8×4 image blocks 406 and 408, as illustrated in FIG. 4C. Next, if the 8×8 image block was vertically divided, one of the 4×8 image blocks 402 and 404 is selected as the new current image block. If each computed variances for the selected 4×8 image block exceeds the threshold $T_v$, then the 4×8 image block is horizontally divided in half into two 4×4 image blocks 410 and 412, as illustrated in FIG. 4D. However, if the 8×8 image block was horizontally divided, one of the 8×4 image blocks 406 and 408 is selected as the new current image block. If each computed variances for the selected 8×4 image block exceeds the threshold $T_v$, then the 8×4 image block is vertically divided in half into two 4×4 image blocks 414 and 416, as illustrated in FIG. 4E. This process is continued until each computed variances for a current image block does not exceed the threshold $T_v$, or until the new current image block is a 2×2 image block, as illustrated in FIG. 4F. Since a 2×2 image block includes only a single value for each of the R, G1, G2 and B color planes, the image block cannot be further divided without losing some of the color values.

Figure 5:
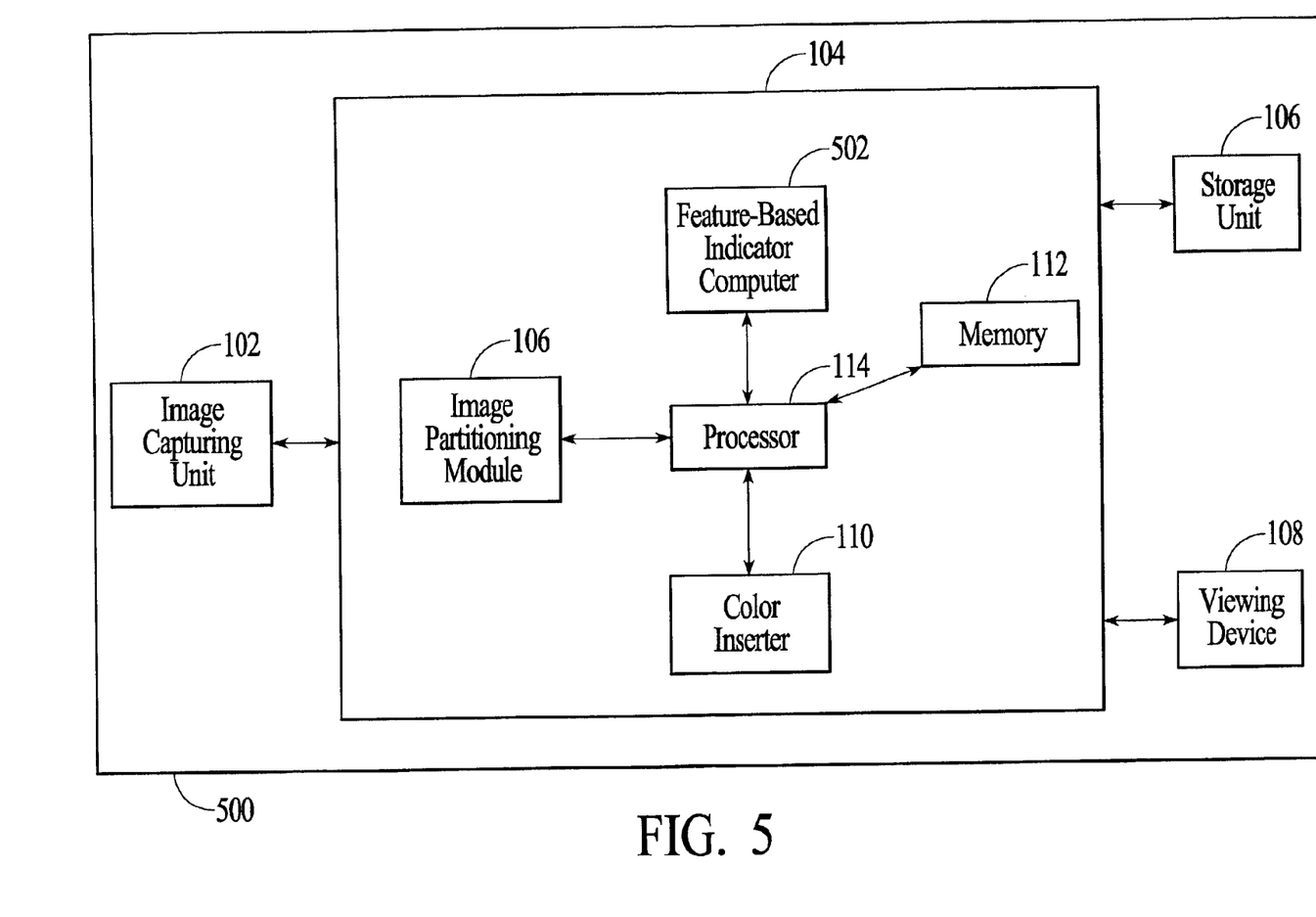
FIG. 5 is a block diagram of an image processing system in accordance with a second embodiment of the present invention.

In FIG. 5, an image processing system 500 in accordance with a second embodiment of the invention is shown. The image processing system 500 includes most of the components of the image processing system 100 of FIG. 1. The only difference between the two image processing systems 100 and 500 is that the statistical indicator computer 108 of the image processing system 100 has been replaced with a feature-based indicator computer 502 in the image processing system 500. In contrast to the statistical indicator computer 108, the feature-based indicator computer 502 operates to compute a feature-based indicator, instead of a statistical indicator. In an exemplary embodiment, the feature-based indicator computer 502 computes the gradient for each of the R color values, G color values (both G1 and G2 color values), and B color values within a current image block of an input mosaiced image. However, in other embodiments, the feature-based indicator computer 502 may compute other feature-based indicators.

Figure 6:
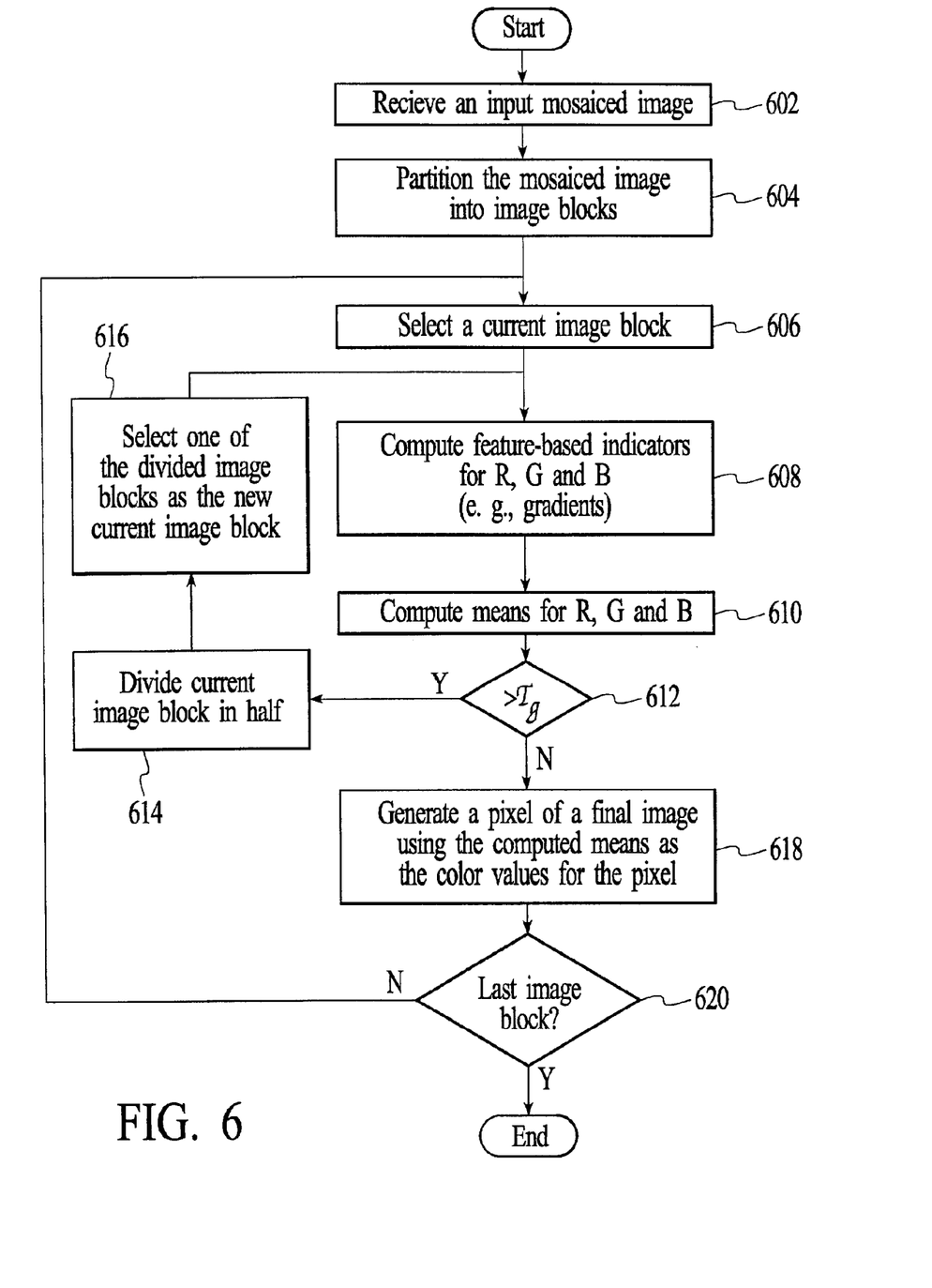
FIG. 6 is a process flow diagram of the demosaicing and resizing operation of the image processing system of FIG. 5.

The demosaicing and resizing operation of the image processing system 500 in accordance with the second embodiment is described with reference to a flow diagram of FIG. 6 and the block diagram of FIG. 1. At step 602, an input mosaiced image of a scene of interest is received by the image pipeline unit 104. In the exemplary embodiment, the input mosaiced image is a Bayer patterned image captured by the image capturing unit 102. Next, at step 604, the mosaiced image is partitioned into image blocks. Although the size of the partitioned image blocks can vary, the image blocks are described herein as 8×8 image blocks.

Next, at step 606, one of the 8×8 image blocks is selected to generate a pixel of the final image, which is the demosaiced and resized image of the input mosaiced image. At step 608, a feature-based indicator for each of the R, G and B color values within the current image block is computed by the feature-based indicator computer 502 of the image pipeline unit 104. In the exemplary embodiment, the feature-based indicators are gradients of the R, G and B color values, and thus, the feature-based indicators are described herein as gradients. At step 610, the mean of R color values, the mean of G color values (both G1 and G2 color values), and the mean of B color values within the current image block are computed by the color inserter 110 of the image pipeline unit 104. Steps 608 and 610 may be executed in parallel. Next, at step 612, a determination is made whether any of the computed gradients exceeds a threshold $T_g$, which may be empirically determined by experiments. If none of the computed gradients exceeds the threshold $T_g$, the process proceeds to step 618, where a pixel of the final image is generated by embedding the mean of R color values, the mean of G color values, and the mean of B color values for the current image block as the R, G and B color values into the pixel of the final image.

However, if any of the computed gradients do exceed the threshold $T_g$, the process proceeds to step 614, where the current image block is divided in half. The current image block may be divided horizontally or vertically. Next, at step 616, one of the divided image blocks is selected as the new current image block. The process then proceeds back to step 608, where the new current image block is processed in the same manner as described above with respect to the last current image block. Thus, the computed means of a current image block are not used when there is a significant gradient with respect to any of the color values within the current image block, which indicates that the color values of the current image block are not suitable to generate interpolated color values for the pixel of the final image. Consequently, the current image block is divided to search for an image block that has color values suitable for the pixel of the final image.

After step 618, the process proceeds to step 620, where a determination is made whether the selected 8×8 image block of the input mosaiced image is the last image block to be processed. If so, the process comes to an end. However, if the selected image block is not the last 8×8 image block of the input mosaiced image, the process proceeds back to step 606, where the next 8×8 image block of the input mosaiced image is selected to be processed.

The foregoing descriptions of specific embodiments of the invention have been presented for the purposes of illustration and description. These descriptions are not intended to be exhaustive or to limit the invention to the disclosed embodiments disclosed. Many modifications and variations are possible in light of the above teaching. The embodiments were chosen and described in order to explain the principles of the invention and its practical application, to thereby enable others skilled in the art to best utilize the invention and embodiments with various modifications as are suited to the particular use contemplated. It is intended that the scope of the invention be defined by the claims appended hereto and their equivalents.

What is claimed is:

1. A method of demosaicing and resizing a mosaiced image comprising:

receiving a current image block of said mosaiced image;

computing an indicator of said current image block based on color data of said current image block; and generating a resized image block from said current image block of said mosaiced images in response to said indicator to produce a resized image of said mosaiced image, including embedding selected color information from said current image block of said mosaiced image into said resized image block such that said resized image of said mosaiced image is demosaiced.

2. The method of claim 1 wherein said computing of said indicator of said current image block includes computing a statistical indicator from said color data of said current image block.

3. The method of claim 2 wherein said computing of said statistical indicator includes computing a variance from said color data of said current image block, said variance being used as said statistical indicator.

4. The method of claim 3 wherein said computing of said variance from said color data of said current image block includes computing said variance from values within said current image block for a particular color.

5. The method of claim 1 wherein said computing of said indicator of said current image block includes computing a feature-based indicator from said color data of said current image block.

6. The method of claim 5 wherein said computing of said feature-based indicator includes computing a gradient from said color data of said current image block, said gradient being used as said feature-based indicator.

7. The method of claim 6 wherein said computing of said gradient from said color data of said current image block includes computing said gradient from values within said current image block for a particular color.

8. The method of claim 1 further comprising dividing said current image block to derive a new current image block when said indicator of said current image block meets a predefined criterion.

9. The method of claim 8 further comprising repeating said computing and said generating for said new current image block.

10. The method of claim 8 wherein said dividing of said current image block includes dividing said current image block to derive said new current image block when said indicator of said current image block exceeds a predefined threshold.

11. The method of claim 1 wherein said embedding of said selected color information from said current image block of said mosaiced image into said resized image block includes embedding the means of color values within said current image block into said resized image block.

12. The method of claim 1 where said generating of said resized image block from said current image block of said mosaiced image includes generating a pixel of said resized image from said current image block of said mosaiced image.

13. A system for demosaicing and resizing a mosaiced image comprising:
an image processing module that receives a current image block of said mosaiced image, said image processing module being configured to generate a resized image block from said current image block of said mosaiced image to produce a resized image of said mosaiced image, said image processing module including:
an indicator computer that is configured to compute an indicator of said current image block based on color data of said current image block; and
a color inserter that is configured to embed selected color information from said current image block of said mosaiced image into said resized image block in response to said indicator such that said resized image of said mosaiced image is demosaiced.

14. The system of claim 13 wherein said indicator computer is configured to compute a statistical indicator from said color data of said current image block.

15. The system of claim 14 wherein said indicator computer is configured to compute a variance from said color data of said current image block, said variance being used as said statistical indicator.

16. The system of claim 13 wherein said indicator computer is configured to compute a feature-based indicator from said color data of said current image block.

17. The system of claim 16 wherein said indicator computer is configured to compute a gradient from said color data of said current image block, said gradient being used as said feature-based indicator.

18. The system of claim 13 wherein said image processing module is configured to divide said current image block to derive a new current image block when said indicator of said current image block meets a predefined criterion.

19. The system of claim 18 wherein said indicator computer and said color inserter of said image processing module are configured to compute a new indicator and to embed new selected color information for said new current image block.

20. The system of claim 13 wherein said color inserter is configured to embed the means of color values within said current image block into said resized image block.

21. A method demosaicing and resizing a mosaiced image comprising:
receiving a current image block of said mosaiced image;
computing an indicator of said current image block based on color data of said current image block;
comparing said indicator to a threshold;
dividing said current image block to derive a new current image block of said mosaiced image when said indicator meets a predefined criterion with respect to said threshold; and
generating a pixel from said current image block of said mosaiced images when said indicator does not meet said predefined criterion with respect to said threshold to produce a resized image of said mosaiced image, including embedding selected color information from said current image block of said mosaiced image into said pixel such that said resized image of said mosaiced image is demosaiced.

22. The method of claim 21 wherein said computing of said indicator of said current image block includes computing a statistical indicator based on color data of said current image block.

23. The method of claim 21 wherein said computing of said indicator includes computing a feature-based indicator based on color data of said current image block.

24. The method of claim 21 wherein said embedding of said selected color information from said current image block of said mosaiced image into said pixel includes embedding the means of color values within said current image block into said pixel.

25. The method of claim 21 further comprising repeating said computing, said comparing, said dividing and said generating for said new current image block of said mosaiced image.

* * * * *

UNITED STATES PATENT AND TRADEMARK OFFICE
CERTIFICATE OF CORRECTION

PATENT NO. : 6,989,862 B2  Page 1 of 1
APPLICATION NO. : 09/938438
DATED : January 24, 2006
INVENTOR(S) : Baharav et al.

It is certified that error appears in the above-identified patent and that said Letters Patent is hereby corrected as shown below:

On the Title page, in field (56), under Other Publications", in column 2, line 12, delete "36" and insert - - 38 - -, therefor.

Signed and Sealed this

Fifteenth Day of August, 2006

JON W. DUDAS
*Director of the United States Patent and Trademark Office*